United States Patent [19]

Irving

[11] Patent Number: 4,795,729

[45] Date of Patent: Jan. 3, 1989

[54] STEREOSPECIFIC CATALYST FOR THE PREPARATION OF POLY (1,2-BUTYLENE OXIDE)

[75] Inventor: Nicholas M. Irving, Guatemala, Guatemala

[73] Assignee: The Dow Chemical Company, Midland, Mich.

[21] Appl. No.: 80,089

[22] Filed: Sep. 14, 1987

Related U.S. Application Data

[63] Continuation of Ser. No. 853,101, Apr. 17, 1986, Pat. No. 4,701,520.

[51] Int. Cl.$^4$ .............................................. B01J 31/02
[52] U.S. Cl. .................................... 502/169; 502/171; 556/146

[58] Field of Search ................. 502/169, 171; 556/146

[56] References Cited

U.S. PATENT DOCUMENTS

| | | | |
|---|---|---|---|
| 2,873,258 | 2/1959 | Borkovec | 528/412 |
| 3,099,628 | 7/1963 | Scott | 502/169 X |
| 3,256,211 | 6/1966 | Bailey et al. | 502/171 X |

*Primary Examiner*—Patrick P. Garvin

[57] ABSTRACT

This invention discloses a unique catalyst for the simultaneous sterospecific preparation of high and low molecular weight isotactic poly 1,2-butylene oxide and a method of preparation of that catalyst from butylene oxide monomer and iron chloride.

6 Claims, No Drawings

STEREOSPECIFIC CATALYST FOR THE PREPARATION OF POLY (1,2-BUTYLENE OXIDE)

This is a continuation of application Ser. No. 853,101, filed Apr. 17, 1986, and now U.S. Pat. No. 4,701,520.

BACKGROUND OF THE DISCLOSURE 1,2-butylene oxide is a colorless liquid, soluble in water and miscible with most organic solvents. It is commercially important as an intermediate for various polymers, including poly 1,2-butylene oxide. High molecular weight poly 1,2-butylene oxide (poly BO) can be used as a high efficiency viscosity index (VI) improver for both synthetic and non-synthetic oils. A viscosity index (VI) improver is a lubricating oil additive that has the effect of increasing the viscosity of the oil in such a way that it is greater at high temperature than at low temperature. The development of such a poly BO viscosity index improver is commercially important. Such development involves the efficient polymerization of 1,2-butylene oxide (BO) to a molecular weight high enough to give a good VI, while limited as to shear stability. BO does not polymerize to a high molecular weight as readily as ethylene oxide (EO) or propylene oxide (PO) due to steric reasons, but at the same time, its character is more hydrocarbon-like and oil compatible than either EO or PO. Currently, there is considerable emphasis being placed on the development of high molecular weight poly BO. Common catalysts like KOH-/alcohol, i.e. alkoxides, are not stereospecific and fail to give high molecular weight poly BO. Use of other more sophisticated anionic techniques has also failed to give stereospecific high molecular weight polymer. Very high molecular weights have been obtained with magnesium-AcAc catalysts which have given outstanding VI, however, these samples of poly BO have been quite susceptible to shear degradation.

Coordination catalysts were proven to be most effective initiators for the preparation of high molecular weight poly BO. Such catalysts include zinc diethyl-water complexes, organo magnesium complexes, double metal cyanide complexes, and a complex formed with zinc xanthate, N-butanol and triethylaluminum. Even though the molecular weights have been high, the results have not been very attractive. Some of the coordination catalysts produced poly BO having an excessive molecular weight for practical applications evidenced by the fact it is readily degraded by shear. For the other coordination catalysts, the poly BO yield is low even through high molecular weight polymers are obtained. Polymerization of BO by ionic mechanisms is also known, but the products have been of low molecular weight.

U.S. Pat. No. 2,706,181 discloses that a partially hydrolyzed complex of propylene oxide (PO) and iron chloride ($FeCl_3$) is an effective catalyst in the preparation of high molecular weight isotatic poly propylene oxide (PO). Low molecular weight poly PO was obtained as well. However, this catalyst does not work to polymerize BO, and an analogous catalyst for polymerizing BO and PO monomer has not been known because of difficulty in the process of obtaining a partially hydrolyzed product. Attempts to make an analogous catalyst to that of U.S. Pat. No. 2,706,181 for the preparation of poly BO employing iron chloride $FeCl_3$ have failed because it has been impossible to produce a controlled and selective partial hydrolysis of the catalyst precursor. The effectiveness of this type catalyst depends largely on the success of the hydrolysis step in production.

Problems found in this partial hydrolysis step en route to a catalyst for prolymerizating BO are successfully overcome by the novel and unobvious method of the present invention. Thus, by this invention, it is now possible to prepare an iron chloride-BO-water catalyst for polymerizing BO easily.

DETAILED DESCRIPTION OF THE INVENTION

This invention is a novel and unobvious catalyst that gives up to 100% yield of combined high and low molecular weight isotatic poly 1,2-butylene oxide (BO), in which both weight fractions can be of practical utility as specialty chemicals. The high molecular weight fraction can be used as a shear stable viscosity index (VI) improver for both synthetic and non-synthetic oils, while the low molecular weight fraction can serve in the preparation of various advanced formulations of flexible foams. The fact that this low weight fraction of the polymer BO is also isotatic is very advantageous since it allows production of stress crystallizable segments in polyurethane forms.

As described previously, U.S. Pat. No. 2,706,181 disclosed that a partially hydrolyzed complex of propylene oxide (PO) and iron chloride ($FeCl_3$) is an effective catalyst for the preparation of high molecular weight isotatic poly PO. That catalyst is not effective for polymerization of BO, however, because that catalyst is stereospecific for PO and only partially stereospecific for BO, and thus fails to polymerize BO. In the method of the present invention, a successful way to prepare a catalyst that is completely stereo selective for BO was found. The present catalysts stereo specifically makes it different from alkoxide or ionic-type initiators. In addition, it renders a high molecular weight fraction polymer which is shear stable, and in quantitative yield.

The catalyst was prepared by drying 1,2-butylene oxide (BO) over molecular sieves or by means of $CaH_2$ prior to its utilization. In a flask containing iron chloride and carbon tetrachloride, the dried BO monomer is added slowly while stirring. Temperature is kept constant and at the end of the addition the product is digested over time and hexane or pentane is added. The product is then hydrolyzed by addition of water dissolved in tetrahydrofuran with constant stirring. After sitting overnight, the product is filtered and vacuum dried.

A very viscous, almost solid, brown material is recovered as the product. It is soluble in BO and other organic solvents. This solubility in BO is a definite advantage to obtain high stereospecificity. This catalyst has an indefinite shelf live, is non-pyrophoric, and is air stable. The currently available catalysts are much less stable and have limited shelf life, some even are pyrophoric as exemplified by those made from aluminum. In contrast to the prior art catalyst for polymerizing PO, only the present catalyst produces low molecular weight isotactic polymers in addition to the isotactic high molecular weight fraction. Furthermore, the prior art catalyst is solid, insoluble in the monomer PO, whereas the present catalyst is a very thick tar like substance which dissolves readily in the BO monomer. Of course, the prior art catalyst differs from the current catalyst in the monomers that are employed in preparation as well as the preparation process. Comparisons of the present catalyst with a KOH catalyst or a coordination type catalyst by means of carbon-13 nuclear magnetic resonance scans of high and low molecular weight BO produced reveal the superior, very high degree of stereospecificity of the present catalyst. The formula of the present catalyst is believed to be:

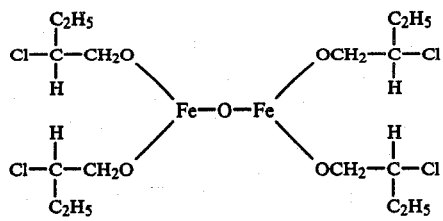

The following examples are illustrative of certain specific embodiments of this invention:

EXAMPLE 1

In order to prepare the novel catalyst of this invention, to a 1-liter, 3-neck, round bottom flask equipped with a thermometer, reflux condenser connected to a nitrogen line and a mercury bubbler, a mechanical stirrer, and a dropping funnel, 250 ml of $CCl_4$ and 40 gm (0.247 mole) of $FeCl_3$ were added. The mixture was mechanically stirred while 86 ml (1 mole) of 1,2-butylene oxide previously dried over 4A sieves (all sieves are U.S. Standard), for one week was added dropwise. The temperature was kept between 25°–30° C. by means of a water bath. After the addition was complete, 250 cc of hekane was added, & then the product was allowed to stand. A solution of 6.75 ml (0.375 mole) of water in 75 ml of tetrahydrofuran was added at a rate of 1 drop/second, while the temperature was raised to 40°–50° C. The mixture was heated 15 minutes at 60° C., dried lightly in vacuo, precipitated in pentane, and washed with three 500 ml portions of the same solvent. It was finally filtered through a course glass frit under $N_2$, dried in vacuo at 60° C. for 48 hours in a dessicator. 90 gm of product were recovered to be used as a catalyst for stereospecific preparation of high and low molecular weight isotatic poly 1,2-butylene oxide.

EXAMPLE 2

To further demonstrate the method of production of the novel catalyst of this invention, the following preparation was done: In a 2-liter, 3-neck, round bottom flask, 120 gm of anhydrous iron chloride ($FeCl_3$) were introduced and immediately covered with 750 ml of carbon tetrachloride ($CCl_4$). The flask was equipped with a mechanical stirrer, a condenser and a "Y" tube fitted with a thermometer and a dropping funnel. 258 ml of $CaH_2$-dried 1,2-butylene oxide (BO) were added dropwise at 30° C. with vigorous stirring. After the BO was added, the mixture was digested 5 minutes at 30° C. and then 30 minutes at 38° C. The mixture was allowed to sit overnight under $N_2$ and was then hydrolyzed with a 20-25 ml $H_2O$ and 80 ml tetrahydrofuran (THF) mixture at 40°–45° C.; the drop rate was 1 drop/second and the temperature rose at 45°–50° C. After the addition of the $H_2O$-THF, the mixture was digested 15 minutes at 60° C. The raw product was vacuum dried by means of distillation and precipitated in three 500 ml batches of pentane. The pentane washes were discarded and the brown solid product vacuum dried at 60° C. for 48 hours. It became a thick tar which was isolated by freezing the flask contents to −78° C. prior to pulverizing. The yield was 135 gm of product catalyst.

EXAMPLE 3

The use of the novel catalyst of this invention is demonstrated by the following procedure that stereo specifically prepares high and low molecular weight isotactic poly 1,2-butylene oxide. In a large citrate bottle, 250 gm of $CaH_2$-dried BO were introduced. The bottle had been previously loaded with 17.3 gm of catalyst. The capped citrate bottle was placed in an autoclave and the contents were reacted at 110° C. for 18 hours. Then, the product was dissolved in tetrahydrofuran (THF) and acetone, and reacted with enough concentrated HCl to form a yellow layer. The product was then washed with three portions of 250 ml $H_2O$, one portion of 250 ml $NaHCO_3$ saturated $H_2O$, and two portions of 250 ml water in that order. The washed product was redissolved in acetone and fractionated at −20° C. The solid fraction was redissolved and fractionated at −20° C. two more times. 77 gm of the high molecular weight poly 1,2-butylene oxide were obtained. The liquid fraction was discarded.

EXAMPLE 4

A 300 ml citrate bottle was charged with 17.3 gm of the catalyst of this invention and 250 gm of 1,2-butylene oxide previously dried over 4A sieves (all sieves are U.S. standard). This mixture was heated overnight at 120° C. in a rotating steam autoclave. Enough tetrahydrofuran was added to dissolve the product, which was stabilized with 1 grm of Ionol. While stirring, concentrated HCl was added until the color turned yellow. The product was washed with three 250 ml portions of water, 250 ml of $NaHCO_3$ solution, and two 250 ml portions of water, in that order, then dissolved in acetone and dried overnight in 4A molecular sieves. This solution was then fractionated at −20° C., which caused precipitation of the high molecular weight poly BO. The low molecular weight polymer was isolated after the solvent was removed with a rotovac.

EXAMPLE 5

In order to determine the percent conversion of BO monomer to polymer, as well as the amount of high and low molecular weight BO polymer formed from various amounts of the catalyst of this invention, a series of runs was carried out utilizing the procedure of the above Example 4. It was found the monomer BO is fully polymerized after a minimum amount of catalyst is used, approximately 6% by weight. The highest conversion to a shear stable high molecular weight polymer corresponds to 7.6%. The results are shown in Table 1.

TABLE I

| Weight % Catalyst | % Composition | Molecular Weight |
|---|---|---|
| 3.1 | 9 | oligomers |
|  | 29 | oligomers |
|  | 52 | oligomers |
|  | 10 | 300,000 |
| 6.0 | 7 | oligomers |
|  | 80 | 30,000 |
|  | 13 | 200,000 |
| 7.6 | 53 | 15,000 |
|  | 47 | 100,000 |
| 8.7 | 5 | oligomers |
|  | 29 | oligomers |
|  | 66 | 190,000 |
| 13.7 | 18 | oligomers |

TABLE I-continued

| Weight % Catalyst | % Composition | Molecular Weight |
| --- | --- | --- |
|  | 66 | 14,000 |
|  | 16 | 185,000 |

These and high and low molecular weight fractions of poly BO prepared with different amounts of catalyst were analyzed with GPC. The chromatograms indicated the high molecular weight fractions had very broad polydispersity and showed multinodal peaks. A combination of $2\times20^3$A and $2\times10^4$A columns were used, and the peaks calibrated with a PS standard curve. The low molecular weight fractions initially showed single peaks of measurable dispersity.

EXAMPLE 6

In 100 ml pop bottles labeled as 1, 2 and 3, 5 gm of the novel catalyst of this invention were introduced and then the following amounts of monomer were mixed in: Bottle 1—43.6 gm propylene oxide, Bottle 2—21.8 gm propylene oxide and 27.0 gm butylene oxide, Bottle 3—54.1 gm butylene oxide. The bottles were protected with tape and sealed with tight caps. They were each introduced into an autoclave and heated for 24 hours at 100° C. The resulting polymers produced in the bottles were transferred to 500 ml beakers, mixed with 4.5 cc of concentrated HCl and about 250 ml (THF) in each case, and then neutralized with 5.5 gm $NaHCO_3$ in each case. The resulting polymer solutions were filtered under aspirator vacuum through a fritted glass and filter aid, and then excess THF was removed with a rotovac. Bottle 1 opened during the experiment, losing its contents. Bottle 3 produced a yield of 99% or 43.0 gm of polybutylene oxide. Bottle 2 produced a yield of 70.7% or 34.5 gm of copolymer of propylene oxide and butylene oxide.

EXAMPLE 7

The novel catalyst of this invention was used to copolymerize butylene oxide with propylene oxide. An equimolar mixture of 1,2-butylene oxide and propylene oxide, 27.0 gm and 21.8 gm respectively, was mixed into a 130 ml citrate bottle containing 5 gm of the catalyst of this invention and heated overnight at 100° C. in a rotating steam autoclave. The product was worked up as in Example 3. A 71% conversion was obtained, and according to NMR data, the composition of the polymer produced was 74% PO and 26% BO.

While the foregoing is directed to the preferred embodiments of the present invention, other and further embodiments of the invention may be devised without departing from the basic scope thereof, and the scope thereof is determined by the claims which follow.

What is claimed is:

1. A method of making a material used as a catalyst for sterospecific polymerization of 1,2-butylene oxide comprising the steps of:
    (a) stirring ferric chloride into an organic solvent;
    (b) slowly adding dried 1,2-butylene oxide to the stirred organic solvent;
    (c) heating the stirred mixture until the ferric chloride is digested;
    (d) slowly adding water in tetrahydrofuran to the digested mixture;
    (e) precipitating the mixture over a period of time; and
    (f) recovering a precipitant from the mixture.

2. The method of claim 1 wherein the organic solvent added to ferric chloride is carbon tetrachloride.

3. The method of claim 1 wherein the heating step is conducted in the range of about 25° to 38° C.

4. The method of claim 1 wherein the precipitant recovered by filtering is a material having catalytic properties for stereospecifically converting 1,2-butylene oxide into polymeric chains having molecular weights in specified ranges, the material comprising a particulate complex of ferric chloride and 1,2-butylene oxide.

5. The method of claim 1 wherein the 1,2-butylene oxide is dried over 4A sieves prior to use.

6. The material made by the method of claim 1.

* * * * *